(12) United States Patent
Chien

(10) Patent No.: US 7,871,192 B2
(45) Date of Patent: *Jan. 18, 2011

(54) LED NIGHT LIGHT HAS PROJECTION OR IMAGE FEATURE

(76) Inventor: Tseng-Lu Chien, 4F, #214, Lu-Chung 2$^{nd}$ Road, Da-Chi, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/292,153

(22) Filed: Nov. 12, 2008

(65) Prior Publication Data

US 2009/0135380 A1    May 28, 2009

(51) Int. Cl.
*H01R 33/00* (2006.01)
(52) U.S. Cl. .................. 362/641; 362/249.02; 362/644
(58) Field of Classification Search ................ 362/641, 362/642, 643, 249.02–249.06
See application file for complete search history.

(56) References Cited

U.S. PATENT DOCUMENTS 5,595,435 A * 1/1997 Palmer et al. ............... 362/109
7,267,444 B2 * 9/2007 Black, Jr. .................... 353/79

* cited by examiner

*Primary Examiner*—Gunyoung T Lee
(74) *Attorney, Agent, or Firm*—Bacon & Thomas, PLLC

(57) ABSTRACT

An LED night light for night time or dark area use, such as a plug-in wall outlet night light or direct current (DC) operated night light, includes projection or image features to project or present an image, message, data, logo, or time on a ceiling, walls, floor, or other desired surface, or an optics element surface. The optics means may include an optics-lens, slide, convex lens, concave lens, openings, cut-outs, film, grating, or holographic element to create an image at a desired location. The night light may have an adjustable angle or distance between light source and optics-means, as well as other adjustable position, location, or orientation features.

5 Claims, 9 Drawing Sheets

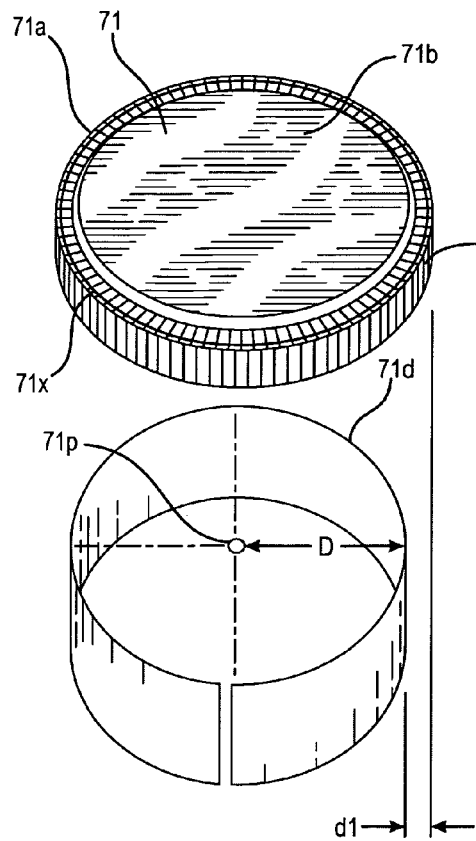
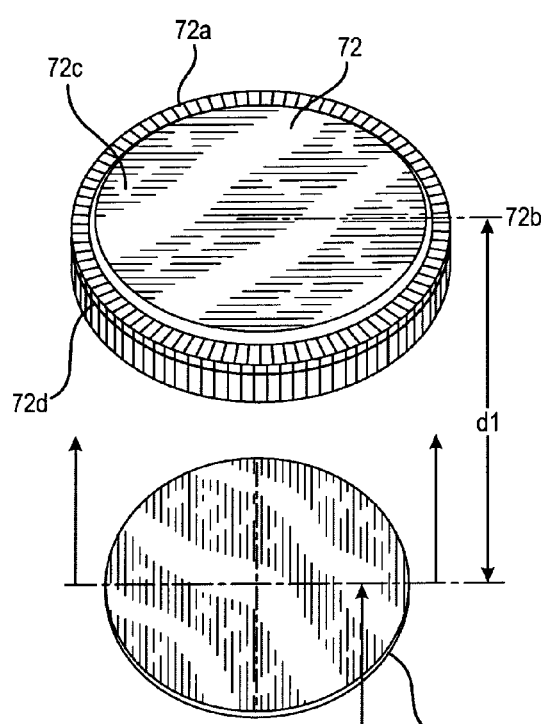
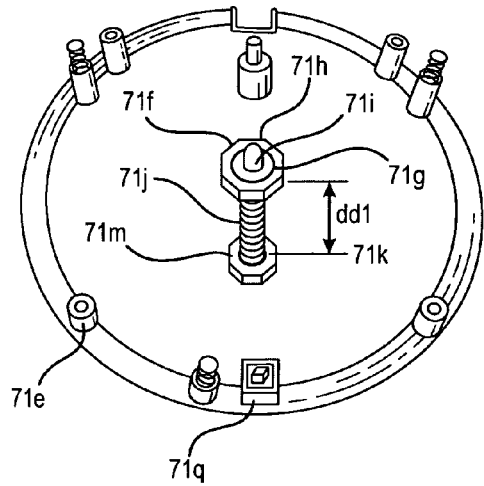
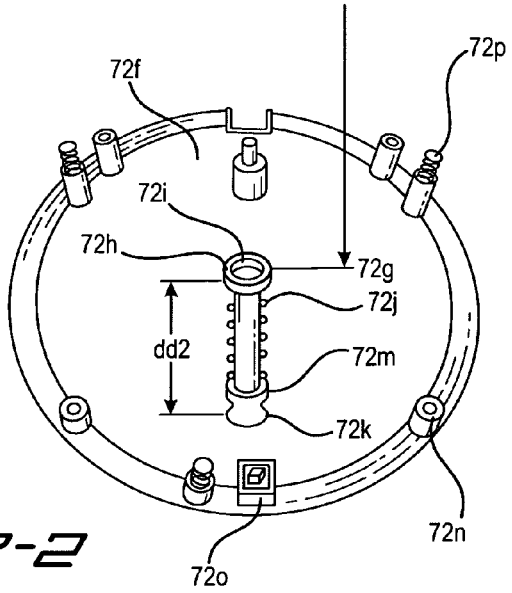
FIG. 7-1
FIG. 7-2

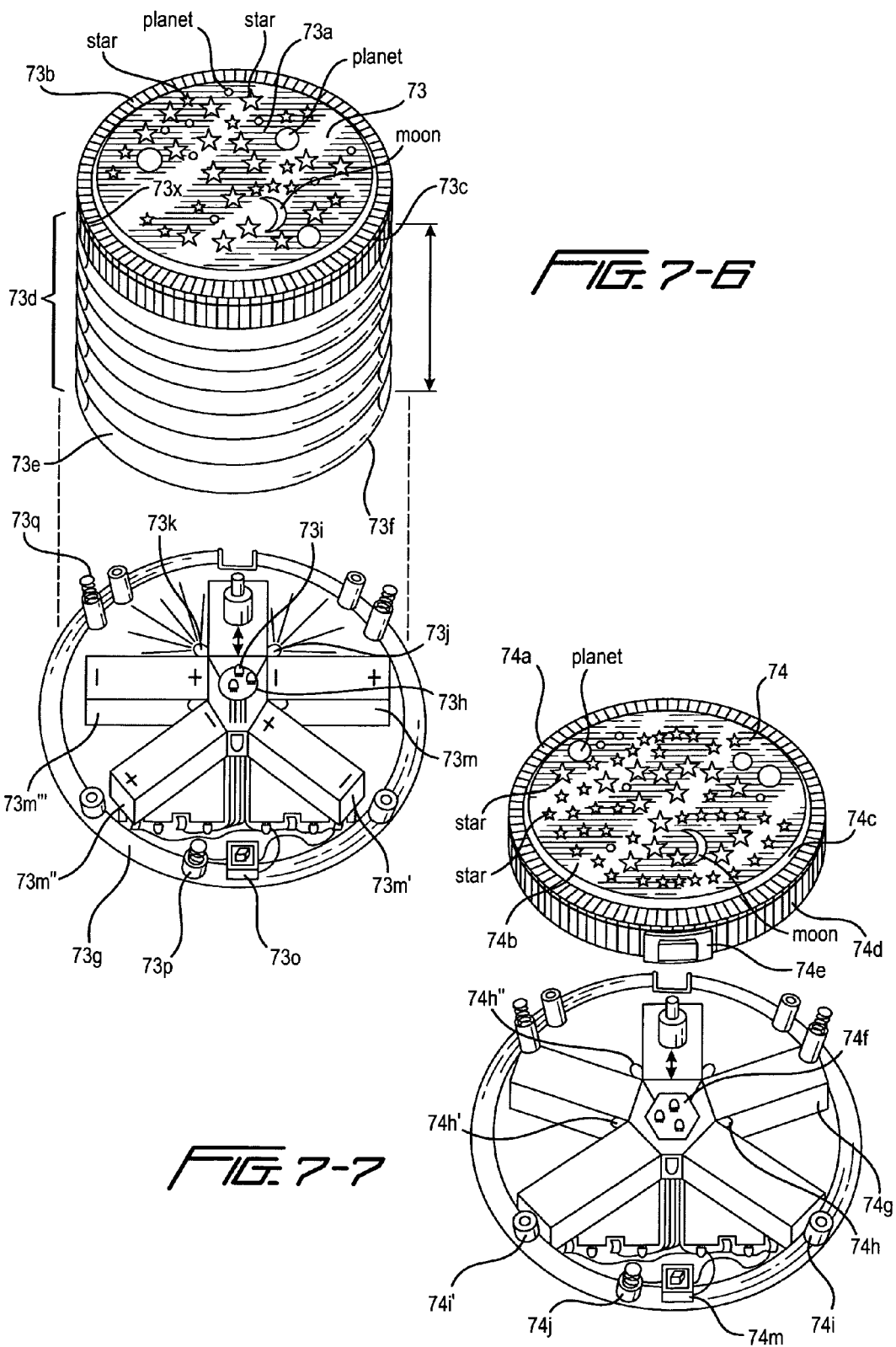

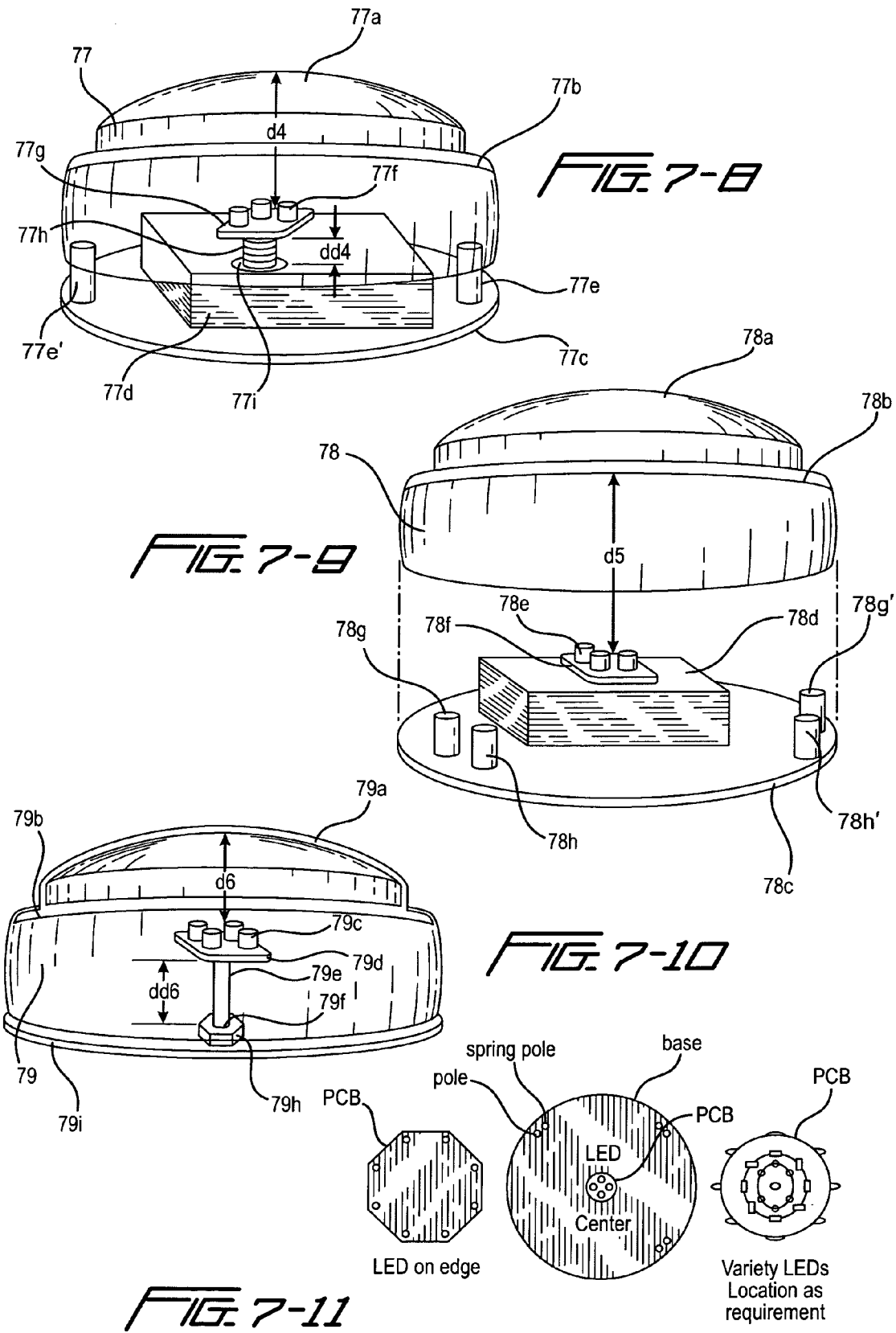

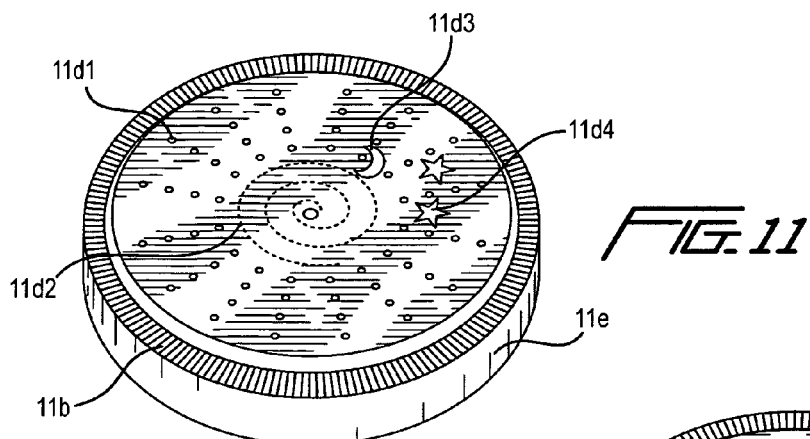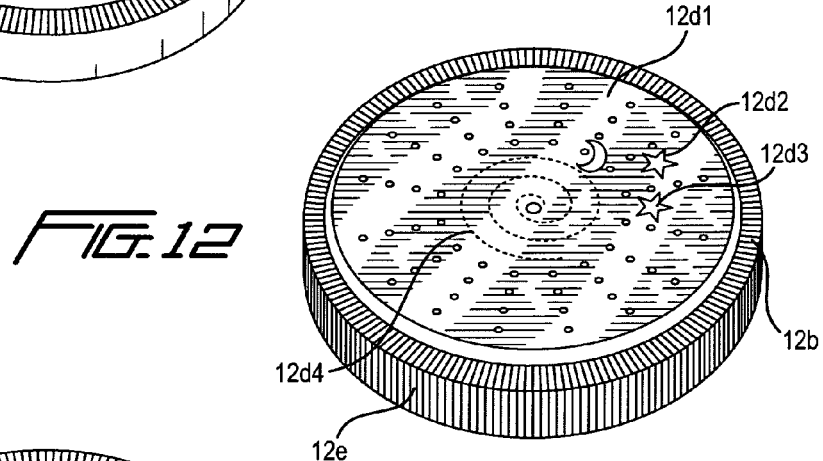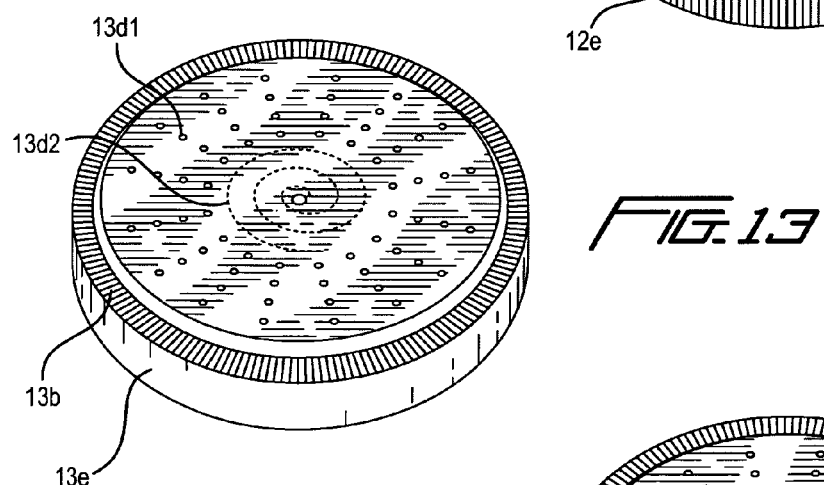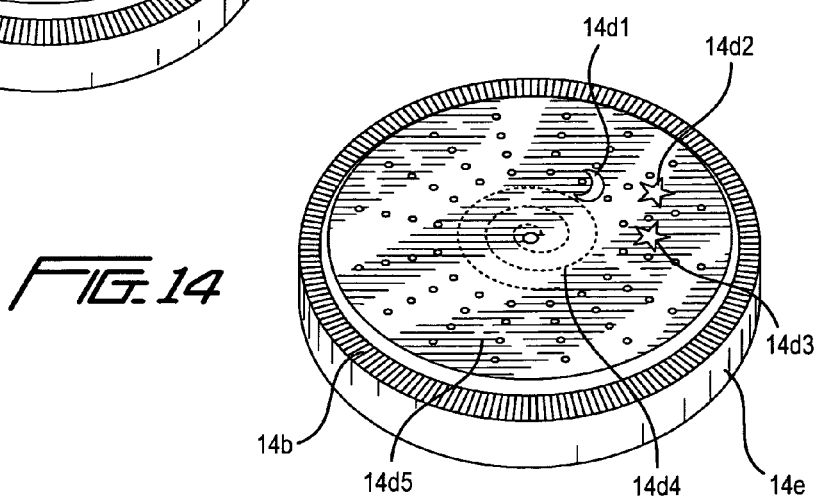

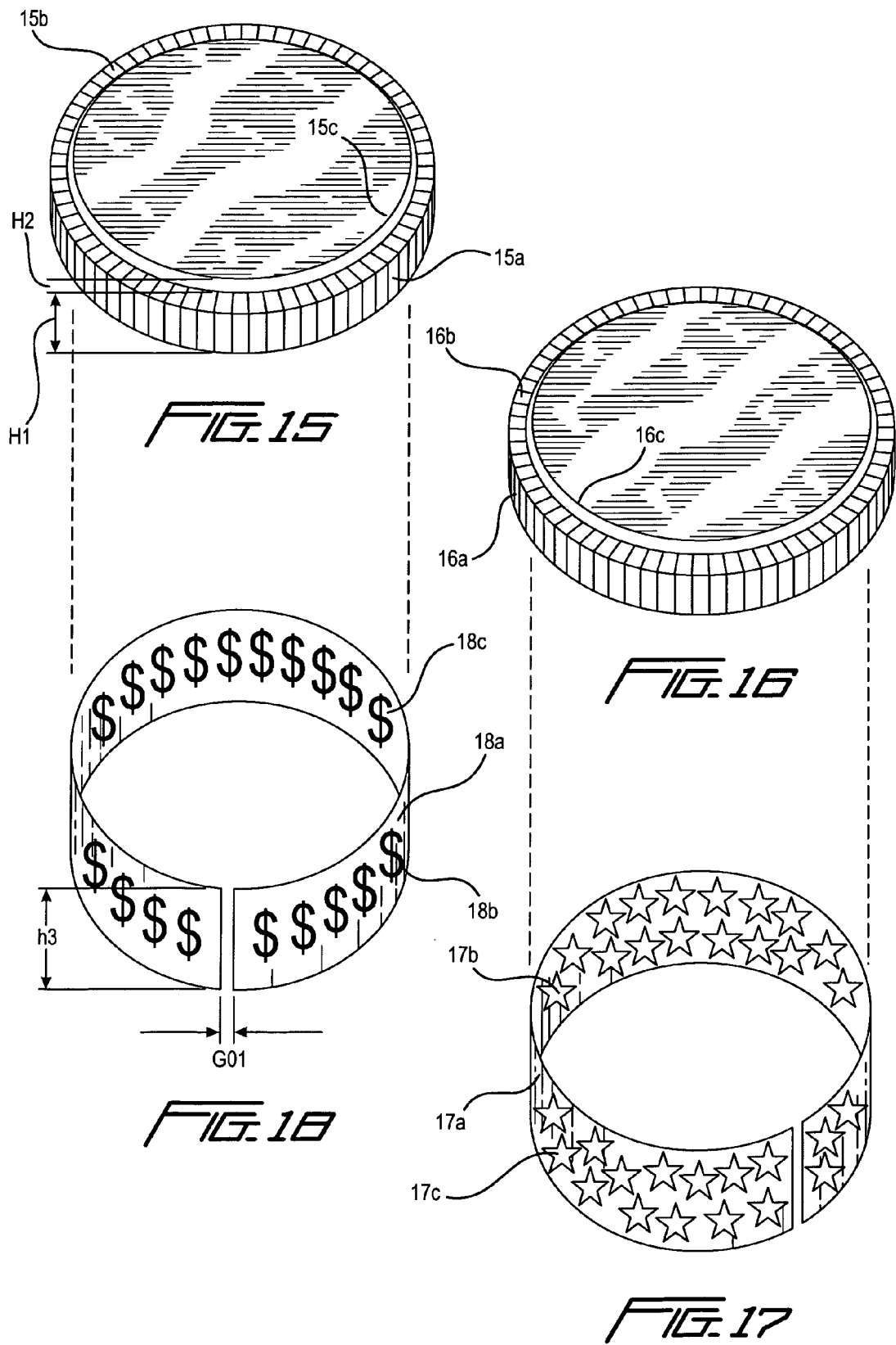

LED NIGHT LIGHT HAS PROJECTION OR IMAGE FEATURE

BACKGROUND OF THE INVENTION

This application has subject matter in common with U.S. patent application Ser. Nos. 12/318,470 ("Projection Night Light"); 12/318,473 ("LED Night Light Has Laser or Hologram Element(s)"); 12/073,889 ("LED track light device"); 12/073,095 ("LED light with changeable position with Preferred power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/527,631 ("LED Night light with interchangeable display unit") 11/498,881 ("Poly Night light"); 11/255,981 ("Multiple light source Night Light"); 11/094,215 ("LED Night light with Liquid optics medium"); 11/092,741 ("Night light with fiber optics"); 10/883,747 ("Fiber Optic light kits for footwear"); 11/498,874 ("Area Illumination for LED night light"); 11/527,629 ("Time Piece with LED night light") 11/527,628 ("Multiple Function Night light with Air Freshener"); 11/806,284 ("U.S. Patent Application LED Night light with more than one optics mediums"); 11/806,285 ("LED Night Light with multiple function"); and 11/806,711 ("Multiple LEDs Light with adjustable angle function").

The current invention provides a light image on a wall, ceiling, floor, other desired surface such as an optic means surface, or any other desired location to enable people to view a desired image such as a star, moon, planet, silver-river, universal image, cartoon character, family photos, or favorite image to cause people pleasure in a dark environment or when falling asleep in a nice environment. It is especially important for youth or kids' room applications to let them have their own favorite image surround them.

The current invention has the following features:

1. It incorporates a simple optics-assembly to provide the projection features, the optics-assembly including a slide located between the LED and first optics means to enable easy assembly without the need for strict position and angle determination.

2. The slide may be a disc with a plurality of slides that can easily be changed by just rotating the disc to easily change the image in upgraded models.

3. The invention may incorporate a position change means for positioning a projector head to change image position, location, and/or size as desired by a simple touch, rotation, push, bend, or twist, so that any outside force applied to the night light cause the image to change position, location, or size instantly.

4. The current invention can have compact dimensions when incorporated with a simple optics-assembly which allows the distance from LED tip to slide to be reduced to zero so that the slide contacts the first optics means.

5. The current invention has no hazardous material such as a glass lens, but instead uses a hinge box with projector means inside to provide the precise positioning needed for a variety of lens types.

6. The current invention may be incorporated with adjustable-focus means to adjust the lens distance to fit a variety of indoor spaces to keep any image perfectly clear.

7. The current invention-may incorporate a transforming construction to change the projector head to a variety of positions and create an image at any desired location.

8. The current invention provides an image surface that is perpendicular to the light beam path, for example a ceiling so that the image can be seen while asleep. Some prior art image projectors on top of a night light need too many expensive and fragile lenses, such as a reflective lens, condensing lens, grating lens, or projection/object lens that must be slid between these complicated lenses, causing a lot of limitations for mass production and night light unit dimensions.

9. The night light of the current invention can fit a majority of market available housings and meet U.S. safety standard requirements.

10. The night light of the current invention may have an adjustable distance between the light source(s) and the optics means (openings, films, hologram means, or grating means) to provide a clear image on desired surface(s).

11. The night light of the current invention may have a new arrangement for battery position, location, and orientation to allow the light source(s) to have the best position and hit the optics means to get the best light effects and performance.

12. The night light of the current invention may have a spiral arrangement for the batteries so that the light source(s) may be put on near center locations and emit light to an edge with a desired distance from the light source(s) to the optics means. It also can cover certain angled areas of all walls areas. This will get the best light performance and image size when applied to a hologram or grating laser film application.

The current invention represents a big improvement over all U.S. prior art including the following U.S. patents:

Prior art U.S. Pat. No. 5,517,264 (Sutton) discloses a projection night light with a preferred 7 Watt bulb (408) which radiates too much heat so that a big distance from the bulb to the optics means is required. Because of the super high heat from the 7 Watt Bulb, the night light requires use of a glass material which is very big and dangerous to a user. Furthermore, the Sutton concept of using a glass reflection lens (604) to enable the image to be seen on the display screen (102) requires too complicated a construction and is not practical for a low cost application. In addition, the glass lens is much too fragile, and also is too heavy for the prongs to stay tightly in the outlet.

Prior art U.S. Pat. No. 7,267,444 (Black, Jr.) discloses a projection night light which has the same problems as Sutton's, including use of too many lenses including (303) reflector mirror, (105) (405) condensing lens, (106) (406) adjusting lens, (403) grating lens (which grating lens corresponds to the one disclosed in the inventor's U.S. Pat. No. 5,667,736), and (415) project/object lens. Some of these lens need to made of a glass material which is very fragile and will be broken because it is too heavy to hold tightly in an outlet. The Black patent also emphasizes that the night light disclosed therein projects an image onto a surface parallel to a path of the light beam, through the use of projection means on top of the night light's wall. This is the reason why Black needs a lot of special optics lenses and slides (109) (209) (309) (409) between the glass lens.

Other prior art includes:

U.S. Pat. No. 6,824,296—Souze et al—Rotating lens with Bulb (78).

U.S. Pat. No. 6,889,918—Yaniv—Projector is wearable and projects an image onto screen (12).

U.S. Pat. No. 7,329,035—Feliciano—Child Night Light for held or worn.

U.S. Pat. No. 7,438,446—McCann—Projector inside a hinged top box (20), None of these can pass a USA safety standard because they will pass weight and pulling tests. Not safe and not qualified at all.

The current invention of an LED light for night time use includes: (A) a plug-in wall outlet night light, or (B) a direct current (DC) operated night light with projection features to project an image, message, data, logo, or time onto a ceiling, walls, floor, optic means surface or any other desired surface.

The current invention has as a light source an LED or plurality of LEDs (such as disclosed in copending U.S. patent application Ser. No. 11/255,981, now allowed) to supply a visible light beam to pass through an optics means or more than one of the optics means (such as disclosed in copending U.S. patent application Ser. No. 11/806,284) and create an image on a desired surface or location with additional features preferably selected from the group including size, dimension, area, height, distance, color, brightness, time period, trigger means, light function, light performance, changeable focus, changeable slides, changeable geometric shape of the night light, and changeable projection head direction.

The current invention incorporates preferred optics means selected from the group consisting of an optics-lens, concave lens, openings, cut-outs, film, grating means, hologram means (such as disclosed in the inventor's U.S. Pat. No. 5,667,736) to create a preferred image at a desired location or surface.

The current invention combines various teachings of the inventor's copending U.S. patent application Ser. Nos. 11/255,981 and 11/806,284 for more than one light source and optics means with teachings of the inventor's U.S. Pat. No. 5,667,736 concerning grating or hologram techniques to create a lot of images and thereby et the best image projection on a wall, ceiling, floor, or surface of an optics means.

BRIEF DESCRIPTION OF THE DRAWINGS

FIGS. 7-1, 7-2, 7-3, 7-4, 7-5, 7-7, 7-8, 7-9, and 7-10 show fourth and fifth preferred embodiments of a direct current (DC) operated LED night light with different optics means selected from openings, cut-outs, transparent or translucent optics means, grating means, hologram means, and films to form images at a desired location with adjustable light source position, location, and distance relative to the optics means to enable a clear image to be seen on a wall, ceiling, optics means surface, or any desired surface.

FIGS. 7-6 shows the manner in which the fourth and fifth preferred embodiments are arranged with optics films to fit a dome cover which has a variety cuts and which overlays or underlays the optics film to fit the dome cover properly.

FIG. 7-11 shows the fourth and fifth preferred embodiments with different size PCBs and different LED arrangements to provide a desired light performance.

FIGS. 7 to 15 illustrate a variety of preferred embodiments of a direct current (DC) operated LED night light with different optics means that may be selected from openings, cutouts, transparent or translucent material, grating means, hologram means, and films to form mages at a desired location with adjustable light source position, location, or distance relative to the optics means to cause a clear image to be seen on a wall, ceiling, optics means surface, or any desired surface.

FIGS. 16 to 20 illustrate a variety of arrangements of an LED or LEDs for the preferred embodiments of the direct current (DC) operated LED night light with different optics means selected from openings, cut-outs, transparent or translucent material, grating means, hologram means, and films to form the images at a desired location with adjustable light source position, location, or distance vis-à-vis the optics means to cause a clear image to be seen on a wall, ceiling, optics means surface, or any desired surface.

DETAIL DESCRIPTION OF THE PREFERRED EMBODIMENTS

The LED night light with projection features of the current invention is different from the conventional marketplace's projection pen, projection key chain, projection toy, or commercial presentation projection equipment.

The current invention is mainly for the night light applications with LED or LEDs as a light source to directly plug into an outlet device, so the circuit needs to have a special design to convert AC 110V 60 Hz input power to drive the LED or LEDs.

The current invention also applies to a direct current (DC) operated night light in which the LED or LEDs may be turned on by pushing or touching a housing. This is similar to the way a conventional puck or tap light is arranged to drive LED or LEDs turn on. The current invention, however, has big improvements to add optics design to the opaque or translucent-lens housings of the conventional puck light.

The current invention incorporates optics-means which may be selected from the group consisting of an optics-lens, slide, convex lens, concave lens, telescope-means, film, grating means, hologram means, transparent material, translucent material, openings, cut-outs with precision optics calculation and optics design to create an image, message, logo, characters, sign, time, or data to project on a desired surface such as a ceiling, walls, floor, optics-means surface or any other desired location.

The current invention also discloses a geometric design for the whole night light, but is not limited to that of the preferred embodiments. Any alternative construction for the night light, including constructions that tilt, swivel, rotate, change position, or have an adjustable focus still fall within the current invention scope as background description for all features of the current invention.

Figure 1:
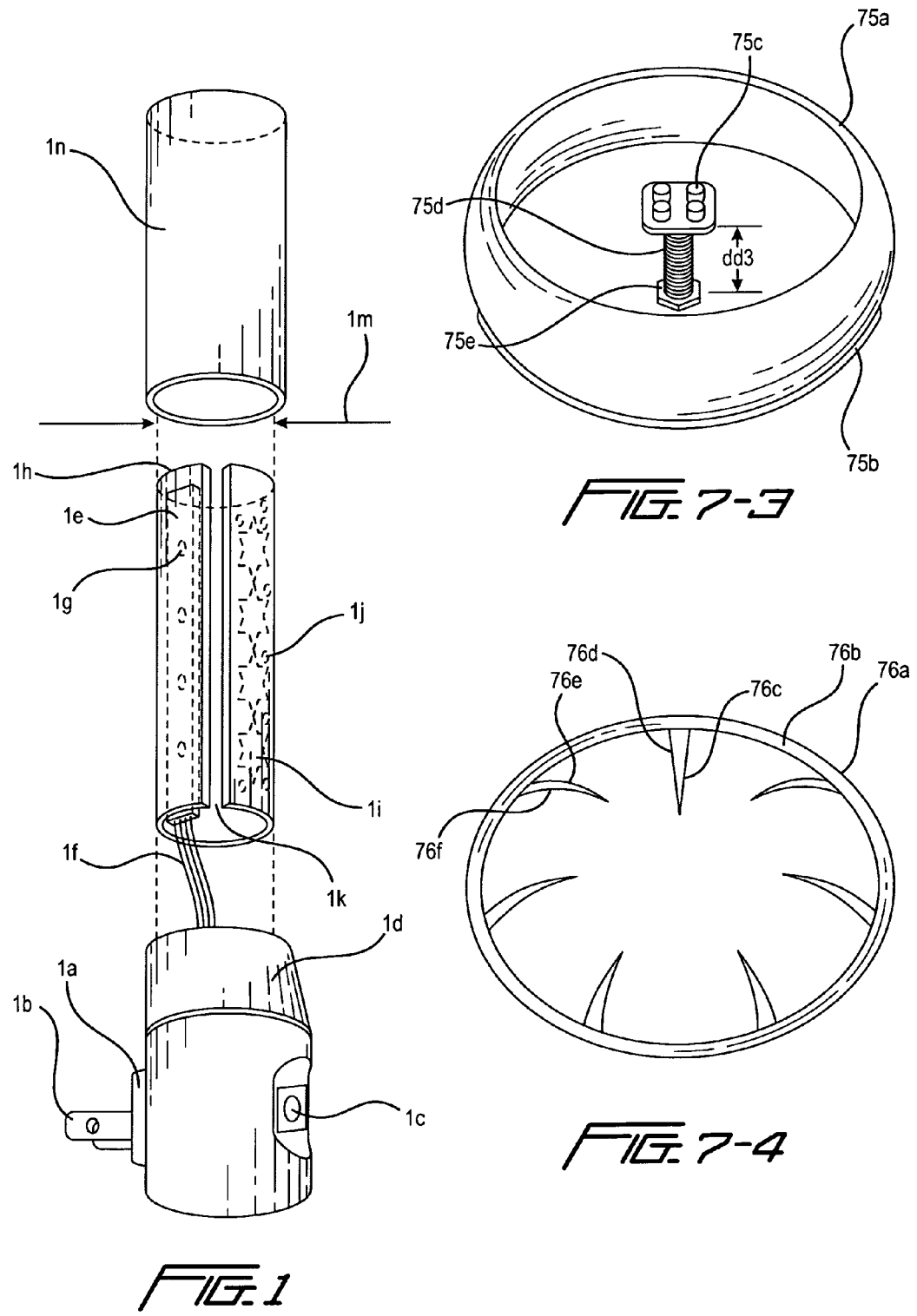
FIG. 1 illustrate a first preferred embodiment of an LED night light with image projection onto an optics means surface. These preferred night lights are plug-in type to connect with an electric outlet. The night light of FIG. 1 utilizes an optics film or optics lens and a transparent or translucent housing as the optics means to create a desired image on the optics means surface.

FIG. 1 shows an LED night light with an image formed by at least one LED (1g) as a light source to supply visible light beams. At least one optics-means is incorporated with the LED or LEDs (1g) which are selected from the group consisting of an optics-lens (1n), film (1h), slide, openings, cut-outs, transparent material (1n), translucent material, grating means (1h), and hologram means (1h) for projecting the desired image (1j) (1i), message, data, logo, time on ceiling, walls, floor, desired surface, or optics means surface (1h). At least one of the power source (1b), circuit means (not shown), and trigger means (1c) is arranged to work with the LED or LEDs (1g) to provide a desired light function, timing, colors, brightness, and/or illumination. The invention may include improvements on either or both of the following configurations:

The LED night light device forms images (1i) (1j) on an optics-means (1h) surface incorporated with laser processed film or an injection piece situated in front of the LED or LEDs (1g).

The LED night light is a plug-in (1b) wall outlet night light or direct current operated LED night light (FIGS. 7 to 20) which has an image shown on the film (1h) or injection piece surface (not shown).

Figure 6:
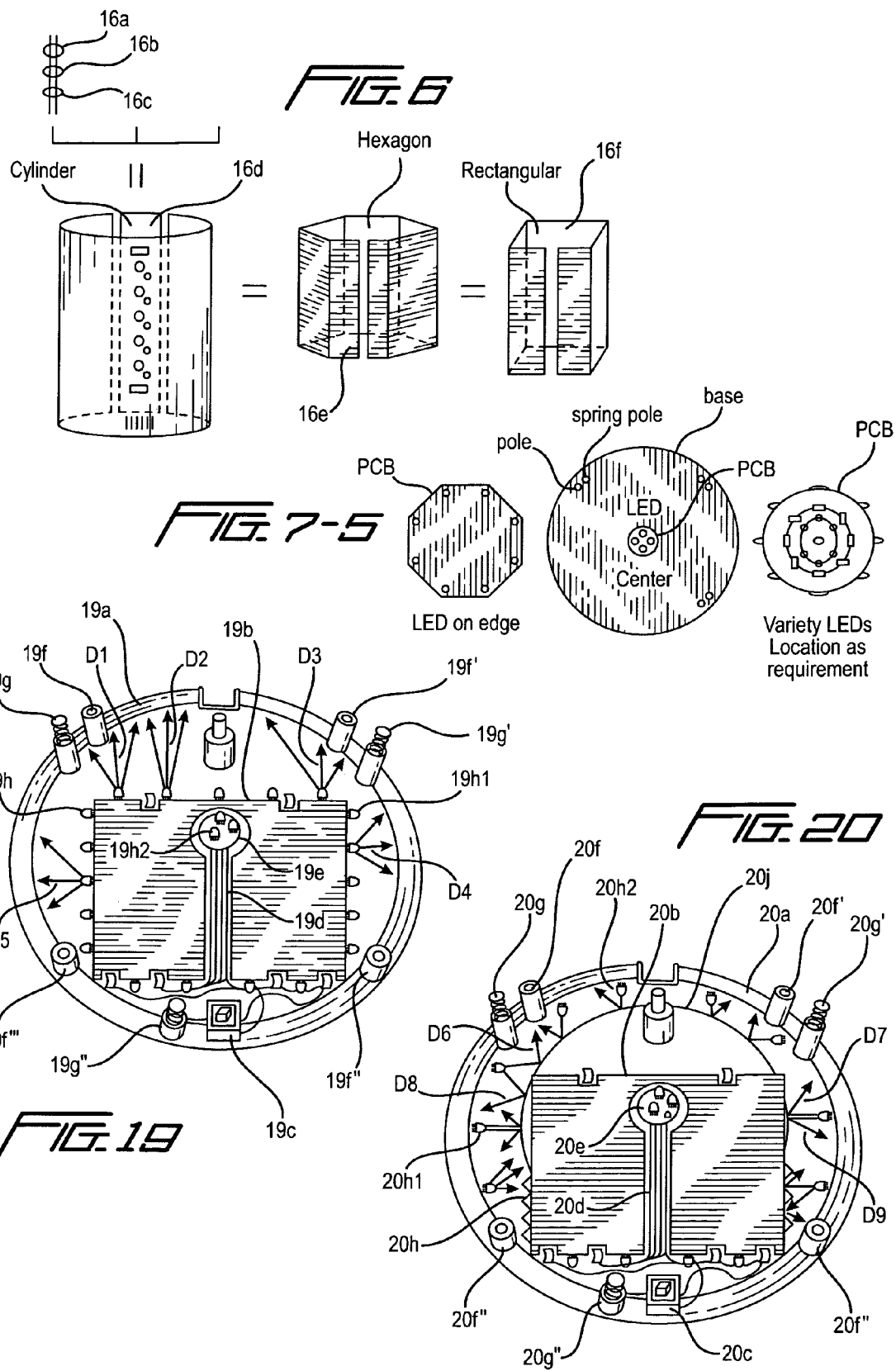
FIG. 6 shows a different construction of a plug-in type night light with different LED or LEDs specifications, arrangement, size, and/or color with desired optics means surrounding the LED or LEDs.

As shown in FIG. 1, a preferred plug-in night light has a base (1a) with prong (1b) to connect with a power source and a sensor (1c) to turn on and off the said LEDs (1g) when the environment becomes dark. A desired number of LEDs (1g) are installed on a conductive means (1e) to emit a light beam to the optics-means (1h), which are preferably in the form of a laser processed film or injection piece (1h) that forms the incoming LED light beam into a desired light image such as a star, dots, circle or any other configuration known to the marketplace or created from a laser lab. The preferred image in this embodiment is a star (1i) or Dots (1j), or any combination thereof. The conductive means (1e) can be printed circuit board, electric wires, isolated copper wires, and/or directly soldered LEDs, depending on market requirements. The top housing (1n) can have a transparent lens, cone, or tube with preferred optics-properties to cause the inner laser image (1i) (1j) to exhibit more eye-catching effects. It can be just a simple plastic tube or cone as desired. As shown in FIG. 6, the inner LED or LEDs arrangement can use a variety of alternative LED types such as (16a) which has an LED chip fixed on two isolated copper wires (16c) and sealed by epoxy. The LED type can also be LED dice (16b). The LEDs can be arranged inside a cylindrical laser optics-means (in a film or injected piece) with a desired arrangement as illustrated in FIG. 16d, on the inside of a hexagonal laser optics-means (16e), or arranged inside a rectangular laser optics-means (16f).

Figure 2:
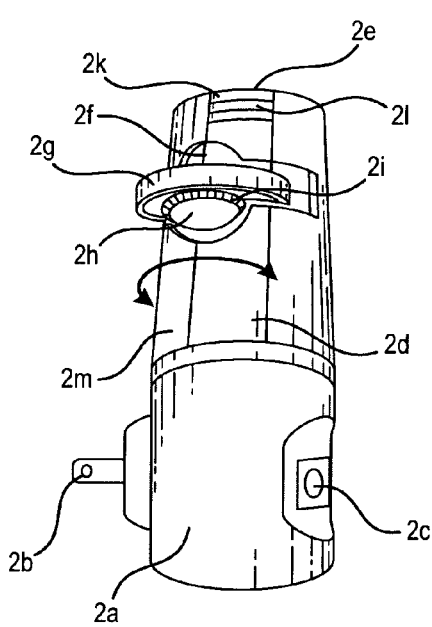
FIGS. 2 and 3 show a different viewing angles of the current invention's image projection on a wall, ceiling, floor, or optics means surface by a plug-in type night light featuring changeable slides.

FIG. 2 shows a plug-in LED night light (2a) with projection features. At least one LED (not shown) serves as a light source to supply visible light beams. At least one telescoping optics-means (2d) is combined with the LED or LEDs and slide(s) (2i), film, openings (2e), cut-outs (2f), a transparent material piece (2m), a translucent material, grating means, or hologram means to project the desired image, message, data, logo, or time on a ceiling, walls, floor, desired surface, or optics means surface. At least one of the power source (2b), circuit means (inside of 2a), and trigger means (2c) is arranged to work with the LED or LEDs to get a desired light function, timing, colors, brightness, and/or illumination. The LED night light device (2a) with projection features has a changeable slide (2i), film, angle, position, orientation, light functions, and/or light effects features.

As shown in FIG. 2, the LED night light (2a) has a base with a prong (2b) and sensor (2c) with a preferred circuit inside the base to turn on the LED or LEDs and supply a light beam to project the slides' (2i) image to the top ceiling. The night light has a top lens (2m) with an opening (2e) to allow the telescoping optics-means (2d) lens (2k) to be installed and project the image to the top ceiling. The top lens (2m) also has a cut-out (2f) to allow a rotatable slide-disc (2g) to be installed and change the slides (2i) by rotating the slide-disc (2g) to one of plurality of the slides (2i).

Figure 3:
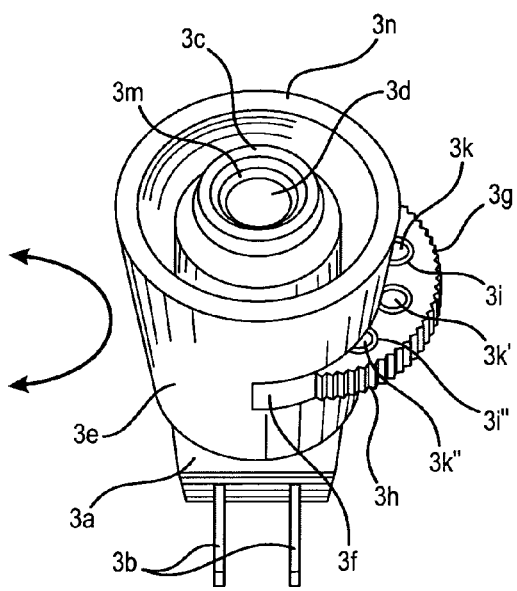

FIG. 3 shows more details of the construction of the embodiment illustrated in FIG. 2. This embodiment has a prong (3b) on the night light (3a) with a top lens (3e) that has a top opening (3c) to allow the telescoping optics-means (3m) to be installed and allow the image to project through the top optics-lens (3d) to the ceiling. The rotatable slides-disc (3g) has a plurality of slides (3k) (3k') (3k") well installed on the discs (3i) (3i') (3i") so that the slide can easily be changed by rotating the disc (3g) to project the preferred image on the ceiling. The top lens (3e) has a cut-out (3f) to facilitate installation of the rotating slide-disc.

Figure 4:
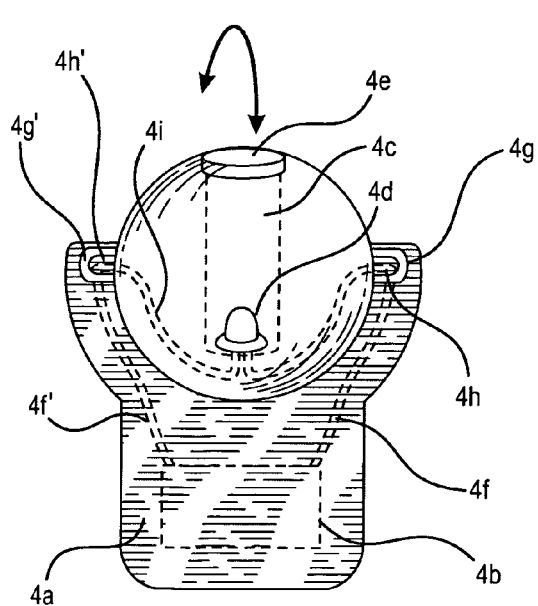
FIGS. 4 and 5 also show different viewing angles of the current invention's image projection on a wall, ceiling, floor, or optics means surface by a plug-in type night light featuring rotating means for changing a projection angle.

FIG. 4, shows a plug-in LED night light (4a) with projection features. At least one LED (4d) serves as a light source to supply visible light beams. At least has one telescoping optics-means (4c) is combined with the LED (4d) or LEDs and slide(s) (not shown), a film, openings (4e), cut-outs, a transparent material piece, a translucent material piece (ball), grating means, and/or hologram means to project the desired image, message, data, logo, or time on a ceiling, walls, floor, desired surface, or optics means surface. At least one power source (not shown), circuit means (4b) (4f) (4g) (4h) (4i), and trigger means (not shown) is arranged to work with the LED (4d) or LEDs to get a desired light function, timing, colors, brightness, or illumination. The LED night light device (4a) with projection features thus has a changeable slide, film, angle (the ball can rotate), position (the ball can rotate), orientation (the ball can rotate), light functions, and light effects features.

FIG. 4 shows a plug-in night light (4a) having a power source and circuit (4b) inside the base with conductive means (4f) (4g) (4h) (4i) to deliver electric signals to the LED (4d) and supply the sufficient brightness light into the telescoping optics-means and its slides (4c) to allow the slide image to be projected to the top through the opening (4e) of the ball housing. The ball housing has a rotatable electric connector (4g) (4h) and (4g') (4h') to allow the electric signal to be delivered from the base to inside the ball. It also offer a rotating property to allow the ball housing to be rotated so as to cause the telescoping optics means to project the image to a desired location, surface, or areas.

Figure 5:
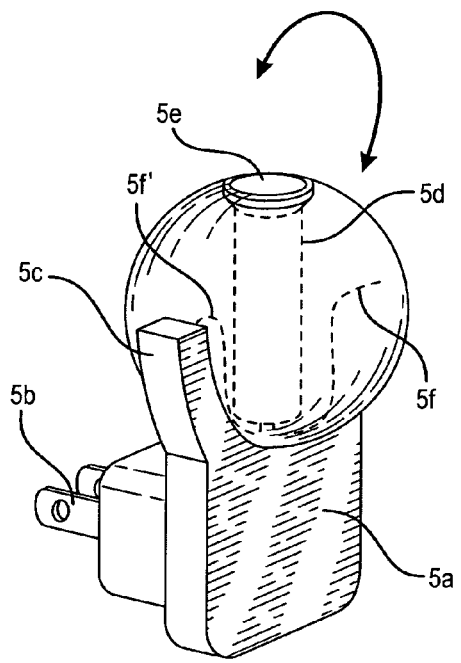

FIG. 5 shows a simpler construction in which the plug-in night light with projection features (5a) has a power source input from a prong (5b) that passes through an inner circuit (not shown) and conductive means (5f) (5f') to an inner LED or LEDs to supply super bright light beam to project a slide's image to a top area.

Figure 7:
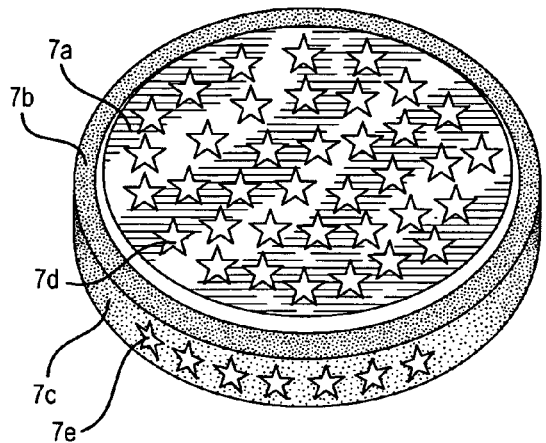
Figure 8:
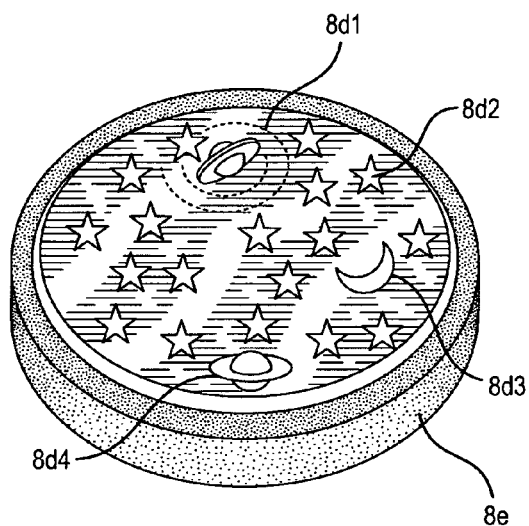
Figure 9:
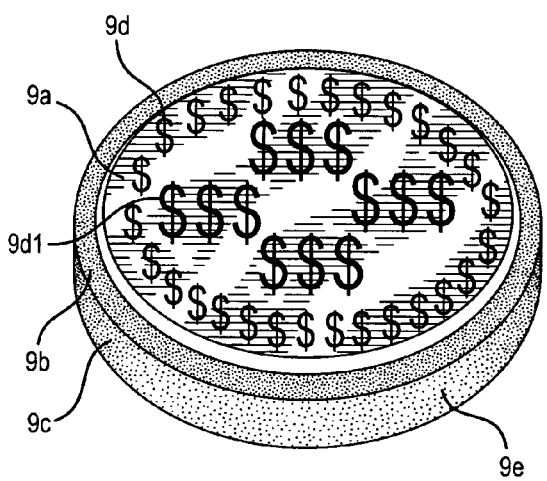
Figure 10:
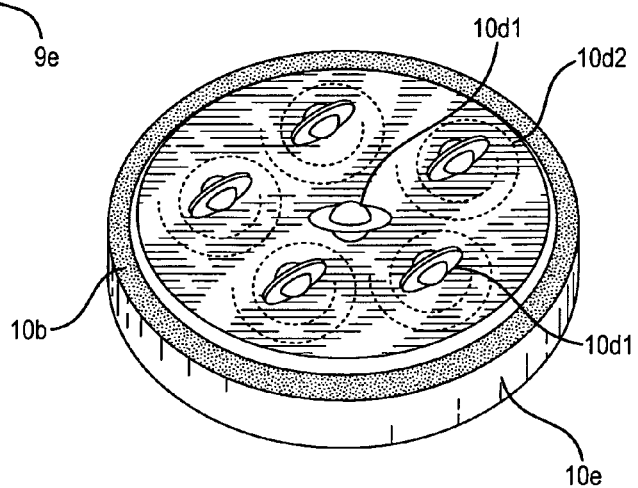

FIG. 7-1 shows a direct current operated LED night light (71) with projection features. At least one LED (71i) serves as a light source to supply visible light beams. At least one of the optics-means (71d) for use with LED (71i) or LEDs (71h) may be selected from the group including an optics-lens (71b), film, openings, cut-outs, transparent material piece, translucent material piece, grating means (71d), and hologram means (71d) to create a desired image (not shown), message, data, logo, or time on a ceiling, walls, floor, desired surface, or the optics means surface (71d). At least one of the power source (not shown), circuit means (71h), and trigger means (71q) is arranged to work with the LED (71i) or LEDs (71h) to obtained a desired light function, timing, colors, brightness, illumination, and/or light effects. The improved night light device (71) with projection features is a direct current (D.C.) power source night light which can be turned on when the housing (71b) is touched or pushed. The said direct current power source may be in the form of an AC adapter with a jack, or a solar power source, wind power source, chemical power source, generator power source, or any direct current power source available from the market.

As shown in FIG. 7-1, the laser processed film or injected piece (71d) is in the form of a circle shape (1d) arranged to fit into the top housing (71a) at the position (71x). The laser processed film or injected piece (71d) is situated a distance D from the light source (71p). The distance D is very important when making the laser processed film or injected piece. The distance D is fixed, and then the laser process film or injected piece is arranged to form a desired image on the laser processed film or injected piece. The laser processed film or injected piece can provide a desired image depending on the distance D, which determines the number of images, the size of the images, configuration of the images. It will therefore be appreciated that the distance (D) between the processed film or injected piece and the light source (71p) is very important to enable a perfect laser image to be shown on the surface of the processed film or injected piece.

As shown in FIG. 7-1, the LED (71i) is installed on a printed circuit board (71h) on a base (71f). The height of base (71f) can be adjusted within distance (dd1). The adjust-means of this preferred embodiment has a screw-nut (71m) with a center hole (71k) to receive a screw-bolt (71j) to allow the base (71f) to adjust the height of the LED position. The LED (71i) and other LEDs can emit light to the laser processed film (71d) when the LED or LEDs are arranged to emit light to the laser processed film (71d). This embodiment can provide a very pretty color image on the walls (71c).

As shown in FIG. 7-2, the laser processed film or injected piece (72c) is positioned in a horizontal position (72d) on top housing (72b) so that the image will be seen on a top area of the DC powered night light (72). The adjustable means in this preferred embodiment uses detents (72j) and a receiving hole (72k) to hold position at a certain height. The LED or LEDs (72i) on the base (72h) can therefore have an adjustable height to change the distance (D) between the laser processed film (72c) and light source (72h) and change the image. The adjustable means has an LED height adjustment range (dd2).

As shown in FIG. 7-3, a wall (75a) is located on the lower housing (75b). The adjustable means (75d) (75e) has a height adjustable range (dd3) to change height of LEDs (75c) relative to PCB (75(c).

FIG. 7-4 shows one preferred arrangement for enabling the laser processed film (76b) to fit into a dome shaped top housing (76a). The flat film cannot fit into the ball shaped dome, so multiple cuts (76b) (76c) (76d) (76e) (76f) must be made into the film. This is an economical arrangement to make a low-end product. An upgraded model with an injected piece may utilize the grating or hologram techniques disclosed in the inventor's prior art U.S. Pat. No. 5,667,736.

FIG. 7-5 an arrangement of the LED or LEDs on a PCB in the lower housing. The PCB can be any size as long as it is smaller than the lower housing. The LED or LEDs can be arranged on the center area or edge of the PCB to face upward or outward for different requirements to vary the distance (D) between the laser processed film or injected piece and the light source.

FIG. 7-6 shows a direct current operated LED night light with projection features in which at least one LED (73i) serves as a light source to supply visible light beams, and least one optics-means (73a) for use with the LED or LEDs is selected from the group including an optics-lens, film, openings (star) (planet), cut-outs (moon), transparent material piece, translucent material piece (73a), grating means, and hologram means to create a desired image, message, data, logo, or time on a ceiling, walls, floor, desired surface, or optics means surface. At least one of a power source (73m) (73m') (73m'') (73m'''), circuit means (73h), and trigger means (73o) is arranged to work with the LED or LEDs (73i) to obtain a desired light function, timing, colors, brightness, illumination, and/or light effects. The LED night light device (73) with projection features is a direct current (D.C.) power source night light which can be turned on when the housing (73a) has been touched or pushed. The direct current power source (73m) (73m') (73m'') (73m''') may take the form of an AC adapter with a jack, or a solar power source, wind power source, chemical power source, generator power source, or any direct current power source available from the market.

As shown in FIG. 7-6, the DC operated LED night light with projection features (73) has a top housing (73a) with a plurality of openings (stars) (moon) (planet) or cut-outs on a transparent material piece (73a). The top housing 973a) has a foldable skirt (73d) which can adjust the height of the top housing, including an optics-lens (73a), to a higher or lower location to change the distance (D) between the optics-lens (73a) and light source (73i). The adjustable means can alternatively be provide on the LED's or LEDs' base (73h) to make the height adjustable from the LED base. The adjustable skirt (73d) or adjustable means on the LED base are preferred examples, but it will be appreciated that any functionally similar or equivalent construction may still fall within the current invention scope, so long as it makes the distance between the optics-means and light source adjustable to get a clear image on the desired surface to fit all kind of room or space.

FIG. 7-7 shows a DC operated night light having a top optics-lens (74b) with a plurality of openings or cut-outs (star) (moon) (planets) to allow the LED light beam to be emitted spread out to the desired surface. The trigger means (74c) are always kept in a same position against the top optics-lens (74b) and will be triggered when the top optics-lens been touched or pushed to turn the LED on and off. In order to get a clear projection image on a desired surface, the adjustable means (not shown) are provided on the LEDs' base to allow the LEDs (74f) to be moved up or down to provide a clear image for different rooms or space.

As shown in FIGS. 7-6 and 7-7, a preferred arrangement of batteries (73m) (73m') (73m'') (73m''') in a spiral spaced allows a plurality of LEDs (73K) (73j) (74h) (74h') (74h'') to be installed as close to center as possible to increase the distance between the light source and optics means such as openings, cut-outs, laser processed film or an injected piece when applied to a wall location. The larger distance will create more exciting image or projection effects.

As shown in FIG. 7-6, LEDs (73j) (73k) are situated very close to a center position so their light beams will spread out to the wall areas and hit the optics-means including openings, cut-outs, laser processed film or an injected piece to provide excellent image or projection effects on a desired surface. If the LEDs are too close to the wall area, then the effects will be limited and the laser tooling work become very difficult. Normally, a 2-10 cm+/−50% distance between a laser processed film or injected piece and the light source is very good and enables use of a variety of available laser processed films or injected pieces available from the marketplace so there will be no need for a big investment in laser tooling for too short a distance application.

FIGS. 7-8, 7-9, 7-10 show three preferred embodiments having different distances (d4) (d5) (d6) between the top optics-lens (77a) 978a) (79a) and light source (77f) (78f) (79c). The top optics-lens may be in the form of openings, cut-outs, laser processed film or an injected piece. The night light of this embodiment also has adjustable means (77h) (79e) with a height adjustable range for (dd4) (dd6) that enables a clear and exciting image to be shown or projected on the desired surfaces. All of these preferred embodiments have DC operated power utilizing batteries and/or a variety of input power sources as discussed above.

FIGS. 7, 8, 9, and 10 show preferred projection DC operated night lights with special configuration (7d) (8d1) (8d2) (8d3) (8d4) (9a) (9b) (10d1) (10d2) of openings or cut-outs on the top optics-lens. Some models also have the openings, cut-outs, laser processed film, or an injected piece on walls (7c) (8e) (9c) (10e) to allow the projection or image to be seen on a desired surface.

FIGS. 11, 12, 13, and 14 show a preferred laser image on a DC operated night light with special configurations of laser image including stars (11d3) (11d4), dots (11d1) (12d1) (13d1) (14d1), a silver river (11d2) (12d4) (13d2) (14d4), moon (11d3) 914d1), planet (not shown), sun, (not shown) or other desired image on the top optic-lens and on the wall (12e).

It will be appreciated by those skilled in the art that the projection and image optics effects can be present in the same unit because both use LED or LEDs as a light source as long as suitable openings, cut-outs, laser processed film or injected pieces are applied to the top optics-lens or wall.

FIGS. 15, 18, and 19 show a preferred DC operated night light for image (18b) (18c) projection or for displaying an image on a desired surface through the wall (15b) with a dollar sign by an opening, cut-outs, or laser processed film or injected piece. The lower housing (19a) has a battery compartment (19b) and switch (19c) with assembly poles (19f) (10f) (19f") (19f"') and spring members (19g) (19g') (19") (19''') to bias the top optics-lens (15c) to an upward position so that pushing the top optics-lens (15c) will turn the LED on and off LED. The LED or LEDs (19h2) are positioned on a PCB (19e) and connected with the power source by conductive wires (19d) to supply the electric signals that turn the LED or LEDs on and off to obtain pre-determined functions, brightness, color, effects, and/or performance. The plurality of LEDs also can be installed along the battery compartment edge, but this is not the best arrangement. The best arrangement would be similar to that shown in FIGS. 7-5, 7-6, and 7-7 to provide a larger distance between the light source and optics-means as discussed above, in which case the plurality of LEDs along the battery compartment will create an exciting projection or image on the desired surface.

FIGS. 16, 17, and 20 show an arrangement that is similar to that shown in FIGS. 15, 18, and 19. The major differences are that the plurality of LEDs emit light beams inwardly towards a circle reflector (20j) and get a lot of light spots on the reflector (20j), the light spots then hitting the optics-means (17a) surrounding the wall of the night light. This teaching of adding the extra reflectors means on the night light is helpful to increase the number of light spots.

This application includes subject matter in common with copending U.S. patent application Ser. No. 12/318,470 ("LED night light with Project features"), and any concepts, drawings, and designs disclosed therein that are applicable to the current invention should fall within the scope of the present application, including any equivalent, same function or replaceable alternative arrangement.

While the above-discussed and mentioned preferred embodiments help illustrate the scope of the current invention, it is to be appreciated that any alternative or equivalent functions of design, construction, modification, or upgrade may still fall within the scope of the invention, and that the current invention is not limited to the details described or mentioned above. Any alternative or equivalent arrangement, process, installation, design, or changes from the current invention may still fall within the scope of the current invention, including variations in the power source, conductive means, geometric shape of LED-units, connector-means, circuit means, sensor means, switch means, LED elements, attachment means, fixing-means, tightening means, resilient conductive means, and so forth.

The invention claimed is:

1. A light emitting diode (LED) night light with projection features, comprising:
    at least one LED that serves as a light source for visible light beams;
    at least one optics-means including parts selected from the group consisting of a slide, film, openings, cut-outs, transparent material piece, translucent material piece, grating, and hologram that form, or on which is formed, a representation of said image, message, data, logo, or time; and
    at least one of a power source, circuit means, and trigger means arranged to work with said at least one LED to provide at lease one of a desired light function, timing, colors, brightness, and illumination; the improvement comprising:
    a projection lens element; and
    a sealed housing,
    wherein said projection lens element is at one end of said sealed housing and said LED is at another end of the sealed housing with said optics means therebetween, said projection lens element and optics means being arranged perpendicularly to said light beams such that said light beams pass through said optics means and projection lens element to project said image, message, data, logo, or time onto a ceiling, wall, floor, or desired surface that is also perpendicular to said light beams,
    wherein said image, message, data, logo, message, or time projected by said optic means is multiple times larger than said representation of said image, message, data, logo, or time formed on said optics means, and
    said LED night light is a plug-in type night light arranged to be connected with an outlet device.

2. An LED night light as claimed in claim 1, wherein said circuit means is arranged to provide light functions selected from the group consisting of fade-in and fade-out, automatic color changing, sequential or random on and off, chasing, pair flashing, time delay, time period selection, steady on, turn on or off in response to a photo or motion sensor, brightness changing, rotating effects, and other market-available light functions.

3. An LED night light as claimed in claim 1, wherein said optics-means further includes parts selected from the group consisting of an optics lens, a convex lens, a telescoping means, a concave lens, openings, cut-outs, film, a grating, and a hologram to create said image, logo, data, or time, and a desired location.

4. An LED night light as claimed in claim 1, wherein the optics-means has a geometric shape selected from the group consisting of a sphere, ball, and half ball, to project the image, logo, data, or time in three dimensions.

5. An LED night light as claimed in claim 1, wherein said circuit means are selected from the group consisting of a circuit board, integrated circuit, conductive means, switch means, AC jack, solar module, AC plug and wire, AC adapter, sensor means, motion sensor means, and timer means to provide desired light functions and effects.

* * * * *